No. 881,397. PATENTED MAR. 10, 1908.
C. GRAVES.
HAY LOADER.
APPLICATION FILED APR. 2, 1906.

3 SHEETS—SHEET 1.

Witnesses:
W. H. Cotton
Charles B. Gillson.

Inventor:
Clark Graves.
By Louis T. Gillson Atty.

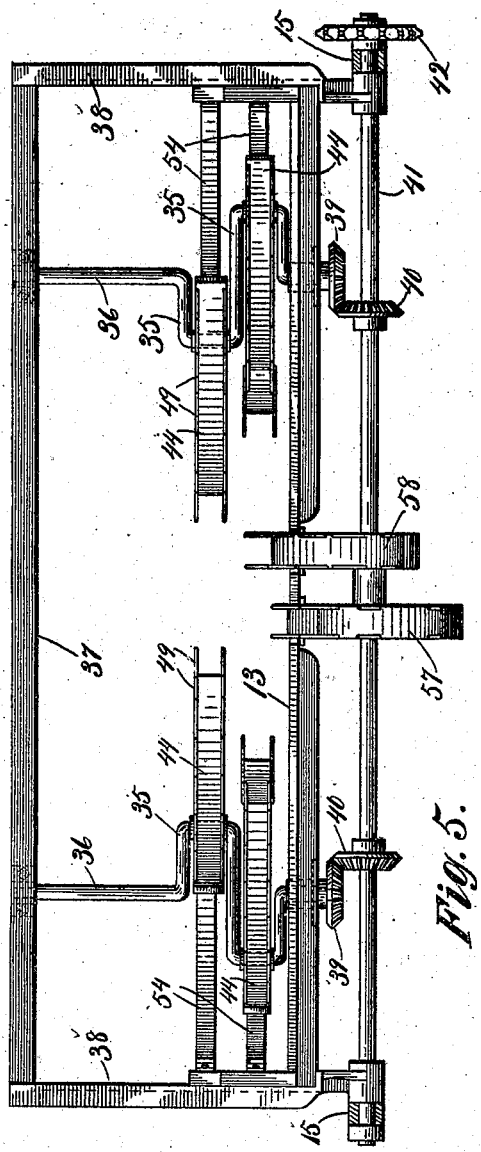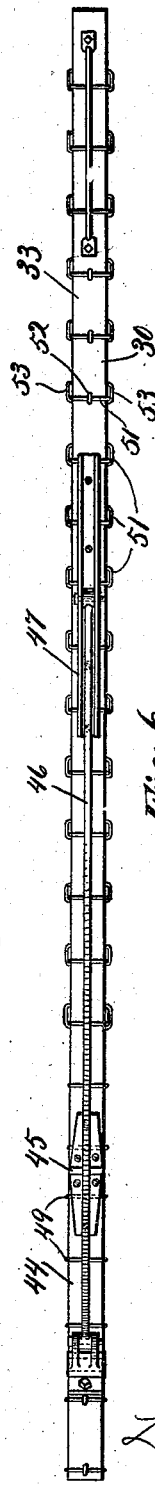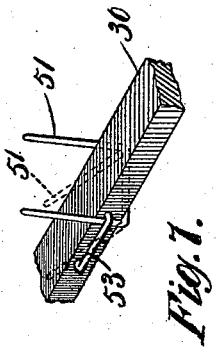

UNITED STATES PATENT OFFICE

CLARK GRAVES, OF SANDWICH, ILLINOIS.

HAY-LOADER.

No. 881,397.

Specification of Letters Patent.

Patented March 10, 1908.

Application filed April 2, 1906. Serial No. 309,433.

*To all whom it may concern:*

Be it known that I, CLARK GRAVES, a citizen of the United States, and resident of Sandwich, county of Dekalb, and State of Illinois, have invented certain new and useful Improvements in Hay-Loaders, of which the following is a specification, and which are illustrated in the accompanying drawings, forming a part thereof.
The invention relates to improvements in hay loaders, its object being to provide improved means for elevating the hay and discharging it upon a wagon.

Figure 1:
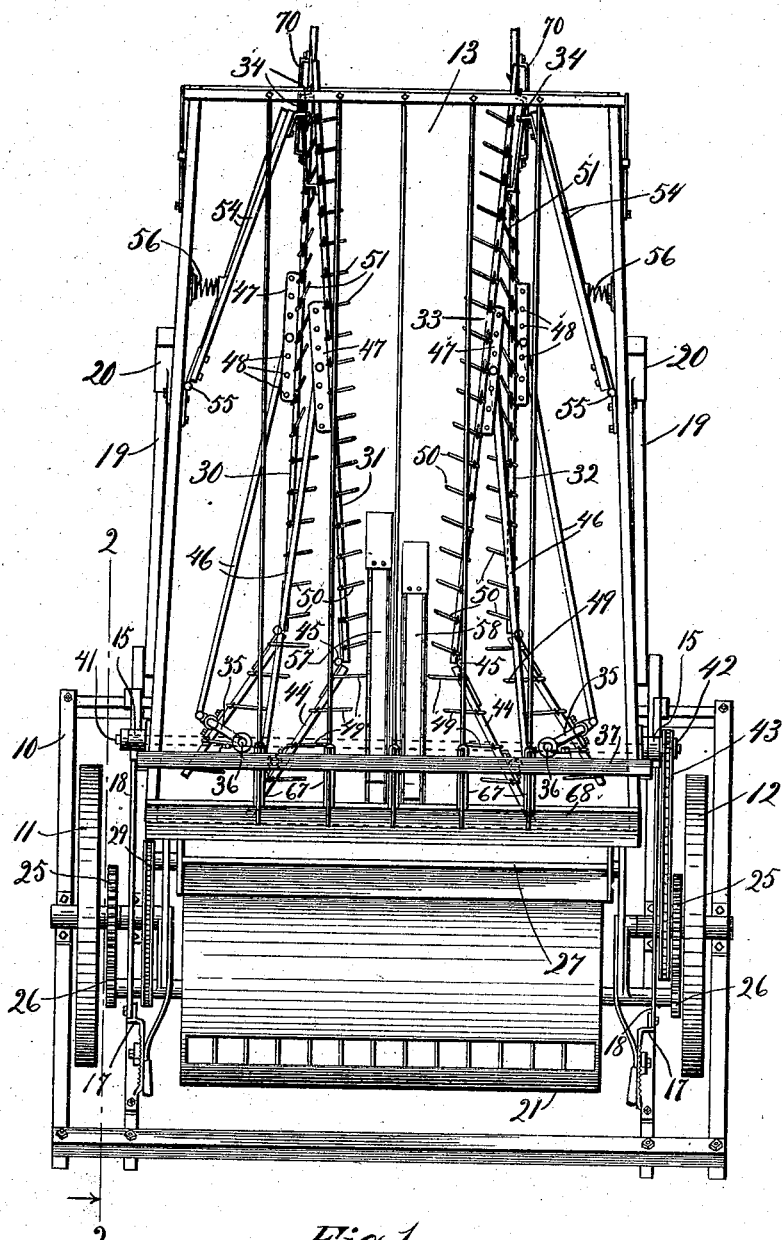
Figure 2:
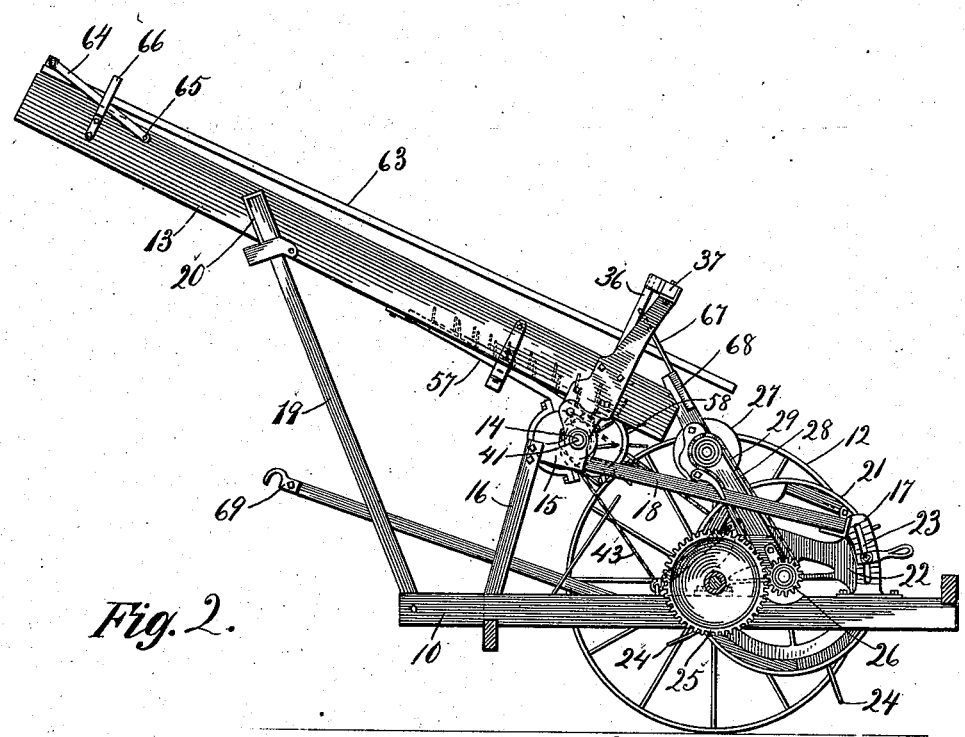
Figure 3:
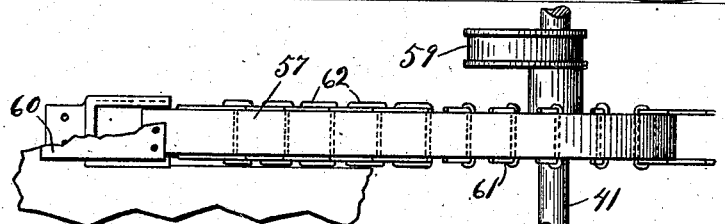
Figure 4:
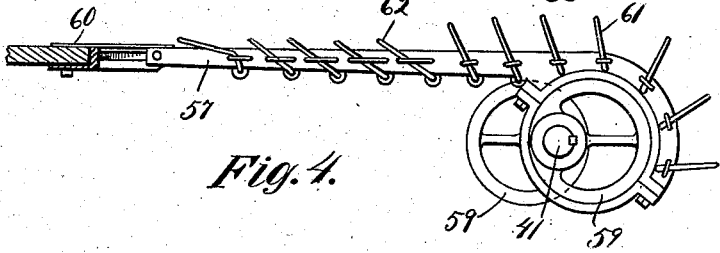

The invention consists, broadly, in reciprocating rakes having an oscillatory movement parallel with the inclined deck over which the hay is elevated and acting against an abutment; preferably such rakes being opposed, each acting as an abutment for the other, and, more specifically, in various details of construction as hereinafter described and as illustrated in the accompanying drawings, in which Figure 1 is a plan view of the machine;
Fig. 2 is a side elevation, partly in section, taken on the line 2—2 of Fig. 1; Figs. 3, 4, 5, 6 and 7 are details of various parts.

The invention is illustrated in connection with a machine of the type shown in Patent No. 378,466 to Slaght. The machine is provided with a rectangular frame 10, carried by traction wheels 11, 12. A deck 13 is pivotally supported at 14 in a pair of brackets 15, carried by a pair of super frames rising from the frame 10 and, as shown, each comprising an upright 16, 17, and a cross-member 18. There being a super-frame at each side of the machine, but one is shown in detail. Braces 19 are pivotally attached to the forward end of the frame 10, one at each side, and are removably engaged with the deck 13, as shown, entering socket-plates 20 secured to the sides thereof. A cylinder 21 is journaled in a pair of adjustable brackets 22, pivoted on the axles of the wheels 11 and 12, and coöperating with a quadrant 23 on the uprights 17 of the super-frames.

The cylinder 21 is provided with rake teeth 24, preferably reciprocally mounted. Inasmuch, however, as this feature is not an essential part of the invention and is old and well known in the art, I have not deemed it necessary to show it in detail. The cylinder 21 is driven through the medium of gear-wheels 25, fixed upon the axles of the carrying wheels and pinions 26 on the cylinder shaft, the cylinder thereby being caused to rotate in a reverse direction to the wheels. A reel is shown at 27, mounted on a pair of arms 28, oscillatable about the shaft of the cylinder and driven by means of a sprocket chain 29 running on suitable sprocket wheels on the shaft of the cylinder and of the reel, this reel serving the purpose of preventing the hay, as raised by the rake-teeth of the cylinder, from being carried over the top of the latter.

A plurality of rake bars 30, 31, 32 and 33, are mounted above the deck 13 and are guided at their upper ends in loops 34, through which they are caused to reciprocate by means of cranks, as 35, on shafts 36, journaled in suitable boxes in the deck 13 and projecting upwardly therefrom, their upper ends being preferably journaled in suitable boxes in a cross-bar 37 supported by uprights 38, 38, rising from the deck. The shafts 36, as shown two in number, are driven by means of bevel gears 39, 40, the latter being mounted on a shaft 41, journaled in suitable brackets depending from the deck 13 and carrying a sprocket wheel 42, over which runs a sprocket chain 43, leading from a suitable sprocket wheel on the axle of the wheel 12.

The rake bars 30 to 33 are arranged in sets, as shown in two pairs, one member of each pair being upon opposite sides of the median line of the deck 13. The cranks driving them are so disposed that the members of each pair of rake-bars reciprocate together, the two pairs moving in alternation. The cranks communicate to the rake bars also an oscillatory movement, causing the members of each pair to approach and move upwardly simultaneously and to recede and descend in like manner.

The lower ends of the rake bars are preferably bent outwardly. As shown each rake bar is composed of two sections, the lower shorter section, as 44, being hinged, as shown at 45, to the upper member, and an adjustable brace-rod 46 connecting the two members, as shown being attached at its lower end to the box in which the crank is journaled on the rake-bar, and at its upper end to a plate 47 carried by the upper section of the rake-bar; this plate having a plurality of pin-holes 48 longitudinally arranged, thereby providing for an adjustable connection of the brace 46 with the rake-bar in order to vary the deflection of the lower section of the latter relatively to the upper section.

The rake teeth 49 in the lower sections of the rake-bars, and 50 in the lower portions of the upper sections thereof are preferably fixed, while the teeth 51 in the upper portions of the upper sections of the rake-bars are pivoted in such manner that they may fold upwardly. When each rake-bar has reached the limit of its upward movement, its lower end is moved outwardly, thereby withdrawing the teeth from the hay, while the teeth of the advancing rake-bars are entering it. As the receding rake-bars descend their upper teeth 51 are caused to swing upon their pivots as they are withdrawn from the hay.

The teeth 51 may be secured to the rake-bars in any suitable manner. As shown, they are U-shaped, straddling the bar and each being secured thereto by a staple 52, its arms projecting through a pair of loops 53, in staple form, set one in each side of the rake-bar and being of sufficient length to permit the teeth to swing, the loops being so disposed as to limit the downward movement of the teeth.

Each of the guide-loops 34 is preferably secured to an arm 54, hinged, as shown at 55, to the side rails of the deck 13, and pressed forwardly by springs, as 56. This mounting of the loops 34 holds the upper ends of the oppositely disposed rake-bars sufficiently close together to insure engagement with the hay, though the latter may be of small quantity. When working on a heavy crop the rake-bars will be forced apart, the springs 56 yielding under the pressure of the load.

The gathering device, in the present instance the rake cylinder 21, is preferably of greater width than the distance it is desirable to place the opposing rake-bars apart, and the latter are bent outwardly at their lower ends, as has been described, in order to compress the hay, as it is received from the gathering device, into a more compact mass. If desirable an additional pair of rake-bars 57, 58, may be mounted to play through the bed of the deck 13, each being driven by a crack or, as shown, an eccentric 59 on the shaft 41, the upper end of each carrying a plate 60, sliding upon the face of the deck 13. As shown these rake-bars 57, 58, are comparatively short. They are intended to start the middle portion of the mass of hay on its upward travel over the deck. Their teeth are arranged in two sets, those 61 at their lower ends being fixed, and those 62 at their upper ends being foldable, as in the case of the upper teeth 51 of the rake-bars 30 and 33; this arrangement insuring the disengagement of the teeth from the hay during the recession of the bars.

The usual wind slats 63 may be employed, being carried at their upper ends by a swinging frame 64, pivoted at 65 to the side rails of the deck 13 and guided in loops 66 rising therefrom, the lower ends being guided in suitable loops 67 mounted in any desired manner, as shown rising from a cross-bar 68 carried by the frame within which the rail 27 is journaled.

The action of the machine is as follows:— The hay being first collected by the gathering device, in the present instance the cylinder 21, and brought into the zone of action of the lower end of the rake-bars 30 to 33, is seized by the advancing bars, and compressed laterally and carried upwardly over the deck 13, the rake-bars 57 and 58, when present, coöperating in the initial advance movement. As each pair of rake-bars reaches the limit of its upward movement, another pair begins its advance movement, and receives the hay from the pair last in action, carrying it forward while the latter pair is retracted. By this means the hay is positively advanced to the upper end of the deck 13 and delivered to the wagon. Should the hay be delivered to the wagon more rapidly than it is distributed by the workman, it will be pushed forward by the action of the loader.

The machine is provided with the usual hook 69, by means of which it may be attached to a wagon, and the upper ends of the rake-bars 30 to 33 are preferably provided with longitudinal loops 70 which play within the loops 34. The members of each pair of rake-heads being opposed, each serves as an abutment against which the other presses the hay, thereby enabling each to retain its hold upon the mass of hay to advance it.

While there has been shown in this application, as means for compressing the hay laterally, inclined hinged sections of the elevating rakes, the invention comprehends broadly any means for compressing the hay to the central portion of the machine, whether the same shall or shall not be used in connection with the particular form of elevating mechanism or with the gathering cylinder herein shown and described.

When the hay crop is light it is operated upon much more efficiently by any form of elevating device when compressed or compacted to some extent.

I claim as my invention,—

1. In a hay loader, in combination, an inclined deck, a reciprocatory elevating rake-bar located above the deck and mounted to oscillate in a plane parallel therewith.

2. In a hay loader, in combination, an inclined deck, a reciprocatory elevating rake-bar located above the deck and mounted to oscillate in a plane parallel therewith, and an abutment opposed to the rake-bar.

3. In a hay loader, in combination, an inclined deck, reciprocatory rake-bars located above the deck and mounted to oscillate in a plane parallel therewith and wind slats above the rake-bars for holding material in engagement therewith.

4. In a hay loader, in combination, an inclined deck, a reciprocatory rake-bar oscillatable in a plane parallel with the deck, and a movable abutment opposed to the rake-bar and coöperating therewith to advance material upwardly over the deck and wind slats above the rake-bars for holding material in engagement therewith.

5. In a hay loader, in combination, an inclined deck, a pair of reciprocatory rake-bars mounted in opposition above the deck, and means for oscillating the rake-bars in a plane parallel with the deck, the oscillatory movement of the rake-bars being timed to cause them to simultaneously approach and recede and wind slats above the rake-bars for holding material in engagement therewith.

6. In a hay loader, in combination, an inclined deck, two pairs of reciprocatory rake-bars mounted above the deck, and means for oscillating the rake-bars in a plane parallel with the deck, the oscillatory movement of the rake-bars being timed to cause the members of each pair to simultaneously approach and recede and the members of the two pairs to move in alternation and wind slats above the rake-bars for holding material in engagement therewith.

7. In a hay loader, in combination, an inclined deck, a pair of reciprocatory rake-bars mounted above the deck, the lower ends of the rake-bars being bent outwardly, and means for oscillating the rake-bars in a plane parallel with the deck, the oscillatory movement of the rake-bars being timed to cause them to simultaneously approach and recede.

8. In a hay loader, in combination, an inclined deck, a pair of reciprocatory rake-bars mounted above the deck, the lower ends of the rake-bars being inclined outwardly and being adjustable relatively to the upper portions thereof, and means for oscillating the rake-bars in a plane parallel with the deck, the oscillatory movement of the rake-bars being timed to cause them to simultaneously approach and recede.

9. In a hay loader, in combination, an inclined deck, a pair of reciprocatory rake-bars mounted above the deck, each rake-bar being formed of two sections hinged together, a brace-rod adjustably connecting the two sections, and means for oscillating the rake-bars in a plane parallel with the deck, the oscillatory movement of the rake-bars being timed to cause them to simultaneously approach and recede.

10. In a hay loader, in combination, an inclined deck, a pair of reciprocatory rake-bars mounted above the deck, the upper ends of the rake-bars being yieldingly supported, and means for oscillating the rake-bars in a plane parallel with the deck, the oscillatory movement of the rake-bars being timed to cause them to simultaneously approach and recede.

11. In a hay loader, in combination, an inclined deck, a pair of reciprocatory rake-bars mounted above the deck, means for oscillating the rake-bars in a plane parallel with the deck, the oscillatory movement of the rake-bars being timed to cause them to simultaneously approach and recede, and spring-supported guide-bars hinged to the deck and engaging the upper ends of the rake-bars.

12. In a hay loader, in combination, an inclined deck, a pair of reciprocatory rake-bars mounted above the deck, means for oscillating the rake-bars in a plane parallel with the deck, the oscillatory movement of the rake-bars being timed to cause them to simultaneously approach and recede, and a gathering device delivering to the lower ends of the rake-bars and wind slats above the rake-bars for holding material in engagement therewith.

13. In a hay loader, in combination, an inclined deck, two pairs of reciprocatory rake-bars mounted above the deck, means for oscillating the rake-bars in a plane parallel with the deck, the oscillatory movement of the rake-bars being timed to cause the members of each pair to simultaneously approach and recede and the members of the two pairs to move in alternation, and a gathering device delivering to the lower ends of the rake-bars and wind slats above the rake-bars for holding material in engagement therewith.

14. In a hay loader, in combination, an inclined deck, a pair of reciprocatory rake-bars mounted above the deck, means for oscillating the rake-bars in a plane parallel with the deck, the oscillatory movement of the rake-bars being timed to cause them to simultaneously approach and recede, a pair of reciprocatory rake-bars, and means for causing the same to oscillate transversely to the plane of the deck.

15. In a hay loader, in combination, an inclined deck, a pair of reciprocatory rake-bars mounted above the deck, means for oscillating the rake-bars in a plane parallel with the deck, the oscillatory movement of the rake-bars being timed to cause them to simultaneously approach and recede, a reciprocatory rake-bar, and means for causing the same to oscillate in a plane transverse to the plane of the deck.

16. In a hay loader, in combination, an inclined deck, two pairs of rake-bars mounted above the deck, the members of each pair being upon opposite sides of the median line thereof, oppositely disposed cranks engaging the members of each pair of rake-bars, the cranks coöperating with the two pairs being oppositely disposed, the several cranks being carried by shafts perpendicular to the plane of the deck and wind slats above the rake-bars for holding material in engagement therewith.

17. In a hay loader, in combination, an inclined deck, a pair of opposed reciprocatory rake-bars, means for oscillating the bars in a plane parallel with the deck, and elevating means located between the opposed rake-bars.

18. In a hay loader, in combination, an inclined deck, a gathering rake at the foot of the deck, means for compressing the material gathered by the rake to the middle of the deck, and opposed reciprocable elevating rakes above the deck and movable in a plane parallel therewith.

CLARK GRAVES.

Witnesses:
D. M. LOSEE,
D. A. HINMAN.